(12) United States Patent
Breedvelt et al.

(10) Patent No.: US 12,498,244 B2
(45) Date of Patent: Dec. 16, 2025

(54) VEHICLE NAVIGATION ROUTE GUIDANCE MANAGEMENT

(71) Applicant: INTERNATIONAL BUSINESS MACHINES CORPORATION, Armonk, NY (US)

(72) Inventors: Ilse Breedvelt, Manotick (CA); Jeffrey A. Kusnitz, Campbell, CA (US); Jana H Jenkins, Raliegh, NC (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 18/337,481

(22) Filed: Jun. 20, 2023

(65) Prior Publication Data

US 2024/0426629 A1 Dec. 26, 2024

(51) Int. Cl.
*G01C 21/36* (2006.01)
*G08G 1/0967* (2006.01)

(52) U.S. Cl.
CPC ....... *G01C 21/3691* (2013.01); *G01C 21/365* (2013.01); *G08G 1/096725* (2013.01)

(58) Field of Classification Search
CPC .............. G01C 21/3691; G01C 21/365; G08G 1/096725
See application file for complete search history.

(56) References Cited

U.S. PATENT DOCUMENTS

| | | | |
|---|---|---|---|
| 9,245,203 B2 | 1/2016 | Hofman | |
| 11,097,726 B2 | 8/2021 | Kim | |
| 11,699,250 B1 * | 7/2023 | McCann | G06F 3/011 345/628 |
| 12,025,450 B2 * | 7/2024 | Toshniwal | G01C 21/3446 |
| 2013/0231820 A1 * | 9/2013 | Solyom | G08G 1/00 701/23 |
| 2014/0012494 A1 * | 1/2014 | Cudak | G01C 21/3415 701/465 |
| 2015/0151742 A1 | 6/2015 | Clarke | |
| 2018/0113477 A1 | 4/2018 | Rodriguez | |
| 2018/0356238 A1 * | 12/2018 | Berlingerio | G01C 21/3438 |
| 2020/0282988 A1 * | 9/2020 | Madrigal | G06Q 10/08355 |
| 2021/0150429 A1 * | 5/2021 | Atanasiu | G01C 21/3438 |

(Continued)

OTHER PUBLICATIONS

"Introduction to YOLO Algorithm for Object Detection," printed from the interent May 19, 2023, 11 pages.

(Continued)

*Primary Examiner* — Scott A Browne
*Assistant Examiner* — Izcalli Rios-Aguirre
(74) *Attorney, Agent, or Firm* — James L. Olsen

(57) ABSTRACT

Aspects of the present disclosure relate to vehicle route guidance management. A first navigation route of a first vehicle can be received. A second navigation route of a second vehicle can be received. The first navigation route can be compared to the second navigation route to determine a currently overlapping section between the first navigation route and the second navigation route. Guidance data guiding a user of the first vehicle to follow the second vehicle can be displayed on a display of the first vehicle and/or instructions can be provided to the first vehicle to automatically follow the second vehicle during the overlapping section between the first navigation route and second navigation route.

15 Claims, 7 Drawing Sheets

(56) References Cited

U.S. PATENT DOCUMENTS

| | | | | |
|---|---|---|---|---|
| 2023/0154195 A1* | 5/2023 | Agarwal | ............... | G06V 20/588 382/103 |
| 2023/0351704 A1* | 11/2023 | Mclachlan | ............. | G06V 20/20 |
| 2023/0408283 A1* | 12/2023 | Wu | ....................... | G08G 1/0969 |

OTHER PUBLICATIONS

"Vehicle-to-Vehicle Communication," printed from the internet May 18, 2023, 6 pages.
"What is a head-up display, and is a HUD worth the money?" printed from the internet May 18, 2023, 8 pages.
"YOLO:Real-Time Object Detection," printed from the internet Jun. 13, 2023, 5 pages.
Ahmad et al., "Automatic Vehicle Identification Through Visual Features," 17th International Conference on Advances in Mobile Computing &Multimedia (MoMM'19), Dec. 2-4, 2019, 10 pages.
Disclosed Anonymously, "Method and System for Activating Navigation Guidance for a Follower Vehicle upon Losing Visibility of a Leading Vehicle," An IP.com Prior Art Database Technical Disclosure, IP.com No. IPCOM000254308ID, Jun. 19, 2018, 3 pages.
Janai et al., "Computer Vision for Autonomous Vehicles: Problems, Datasets and State of the Art," arXiv:170405519v3 [cs.CV] Mar. 17, 2021, 282 pages.
Song et al., "Vision-based vehicle detection and counting system using deep learning in highway scenes, " Springer Open, 2019, 16 pages.
Swan, Ian, "How to Identify Any Car You See," printed from the internet May 18, 2023, 12 pages.
Waze Navigation and Live Map, printed from the internet May 18, 2023, 2 pages.
Curtis Moldrich, "Bmw confirms a full-width head-up display will launch with 2025's Neue Klasse", https://www.carmagazine.co.uk/car-news/tech/what-is-a-head-up-display-hud-how-does-it-work-and-is-it-worth-the-money/, Mar. 15, 2023, 17 pages.

* cited by examiner

VEHICLE NAVIGATION ROUTE GUIDANCE MANAGEMENT

BACKGROUND

The present disclosure relates generally to the field of computing, and in particular, to vehicle navigation route guidance management.

Navigation systems are computer systems that aid users in navigating from a starting point to a destination. Navigation systems typically utilize satellite technology, a knowledge corpus (e.g., a digital map), sensors (e.g., accelerometers), and real-time data (e.g., traffic and weather data) to aid users in navigating. Navigation systems can compute a route using an algorithm (e.g., a shortest path problem) between a starting point and a destination. Navigation systems can output route guidance on a display and/or audio device accessible to a user audibly and/or visually.

Semi-autonomous and autonomous vehicles (i.e., self-driving cars) are vehicles that include autonomation components sufficient for sensing their own environment and taking actions with limited human input. A variety of sensors can be incorporated into semi-autonomous or autonomous vehicles to receive environmental information in a vicinity of the vehicle. Advanced control systems can analyze the sensor data received from the integrated sensors to control functions of the vehicle, such as the navigation route or following distance.

SUMMARY

Aspects of the present disclosure relate to a computer program product, system, and method for vehicle navigation route guidance management. A first navigation route of a first vehicle can be received. A second navigation route of a second vehicle can be received. The first navigation route can be compared to the second navigation route to determine a currently overlapping section between the first navigation route and the second navigation route. Guidance data guiding a user of the first vehicle to follow the second vehicle can be displayed on a display of the first vehicle and/or instructions can be provided to the first vehicle to automatically follow the second vehicle during the overlapping section between the first navigation route and second navigation route.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
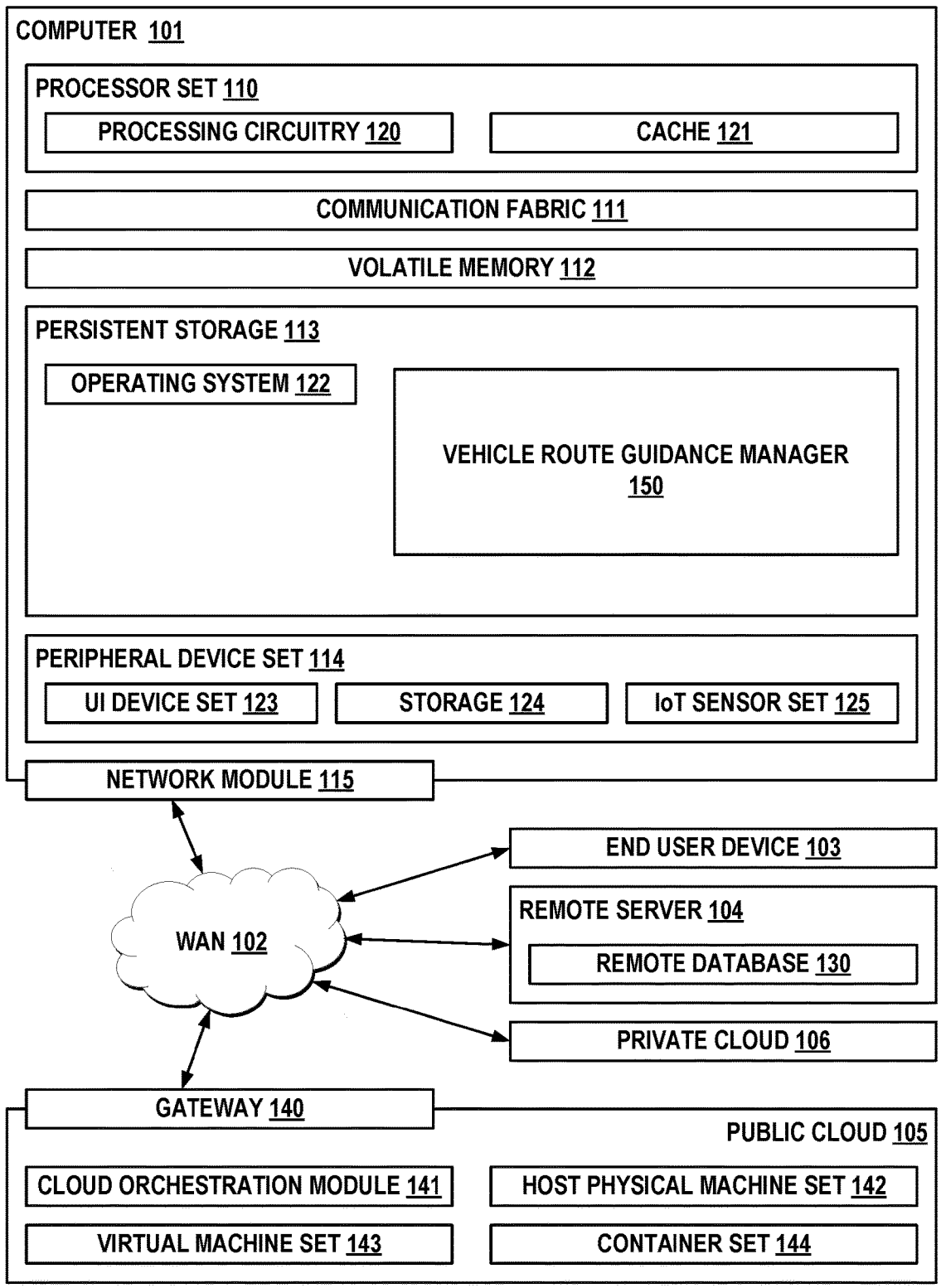
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to vehicle navigation route guidance management. While the present disclosure is not necessarily limited to such applications, various aspects of the disclosure may be appreciated through a discussion of various examples using this context.

As discussed above, navigation systems are computer systems that aid users in navigating from a starting point to a destination. Navigation systems typically utilize satellite technology, a knowledge corpus (e.g., a digital map), sensors (e.g., accelerometers), and real-time data (e.g., traffic and weather data) to aid users in navigating. Navigation systems can compute a route using an algorithm (e.g., a shortest path problem) between a starting point and a destination. Navigation systems can output route guidance on a display and/or audio device accessible to a user audibly and/or visually.

Users utilizing navigation systems frequently make errors when attempting to reach a destination. For example, users can overlook guidance instructions provided by a navigation system and miss a particular exit, turn, or other direction provided by the navigation system. This can lead to frustration of the user, requiring the user to back-track or take a different route. In some situations, this can raise safety concerns, as the user may be required to quickly take action based on a newly calculated navigation route by the navigation system.

Autonomous vehicles can aid users in navigation while requiring little to no user intervention. For example, an autonomous vehicle can be instructed to follow a particular navigation route, and an advanced control system of the autonomous vehicle can execute vehicular actions (e.g., managing speed, lane changes, turns, signals, brakes, etc.) required to reach the destination of the navigation route without requiring user intervention while complying with traffic laws and safety precautions. However, autonomous systems may also be prone to error, such as errors with sensors relied upon by the advanced control system (e.g., resulting from bad driving conditions such as fog, snow, or rain, or resulting from hardware/software errors with the sensors/control system). Though autonomous vehicles are rapidly improving, there are still safety and reliability concerns. As such, aspects of the present disclosure recognize the current drawbacks of navigation systems and autonomous vehicle systems.

Aspects of the present disclosure relate to vehicle route guidance management. A first navigation route of a first vehicle can be received. A second navigation route of a second vehicle can be received. The first navigation route can be compared to the second navigation route to determine a currently overlapping section between the first navigation route and the second navigation route. Guidance data guiding a user of the first vehicle to follow the second vehicle can be displayed on a display of the first vehicle and/or instructions can be provided to the first vehicle to automatically follow the second vehicle during the overlapping section between the first navigation route and second navigation route.

Aspects of the present disclosure provide various improvements. By providing guidance data guiding the user of the first vehicle to follow the second vehicle, the user of the first vehicle may only be required to keep track of the vehicle they are following and not the route they are instructed to follow. This can be completed during a currently overlapping section between routes of the first and second vehicles, ensuring the user of the first vehicle maintains their original route. The guidance data can prevent the user from missing instructions provided by the navigation system. By providing instructions to the first vehicle to automatically follow the second vehicle during the overlapping section, the first vehicle can follow the second vehicle using autonomous components rather than the route it was originally instructed to follow. This can reduce potential errors with autonomous systems, as the first vehicle is instructed to follow the second vehicle instead of the original navigation route. This may enhance processing efficiency performed by the autonomous components of the first vehicle, removing consideration/processing of additional variables that are not important for following the second vehicle which may be considered/processed during routine autonomous navigation of the route.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as vehicle route guidance manager 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vehicle route guidance manager 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in vehicle route guidance manager 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in vehicle route guidance manager 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
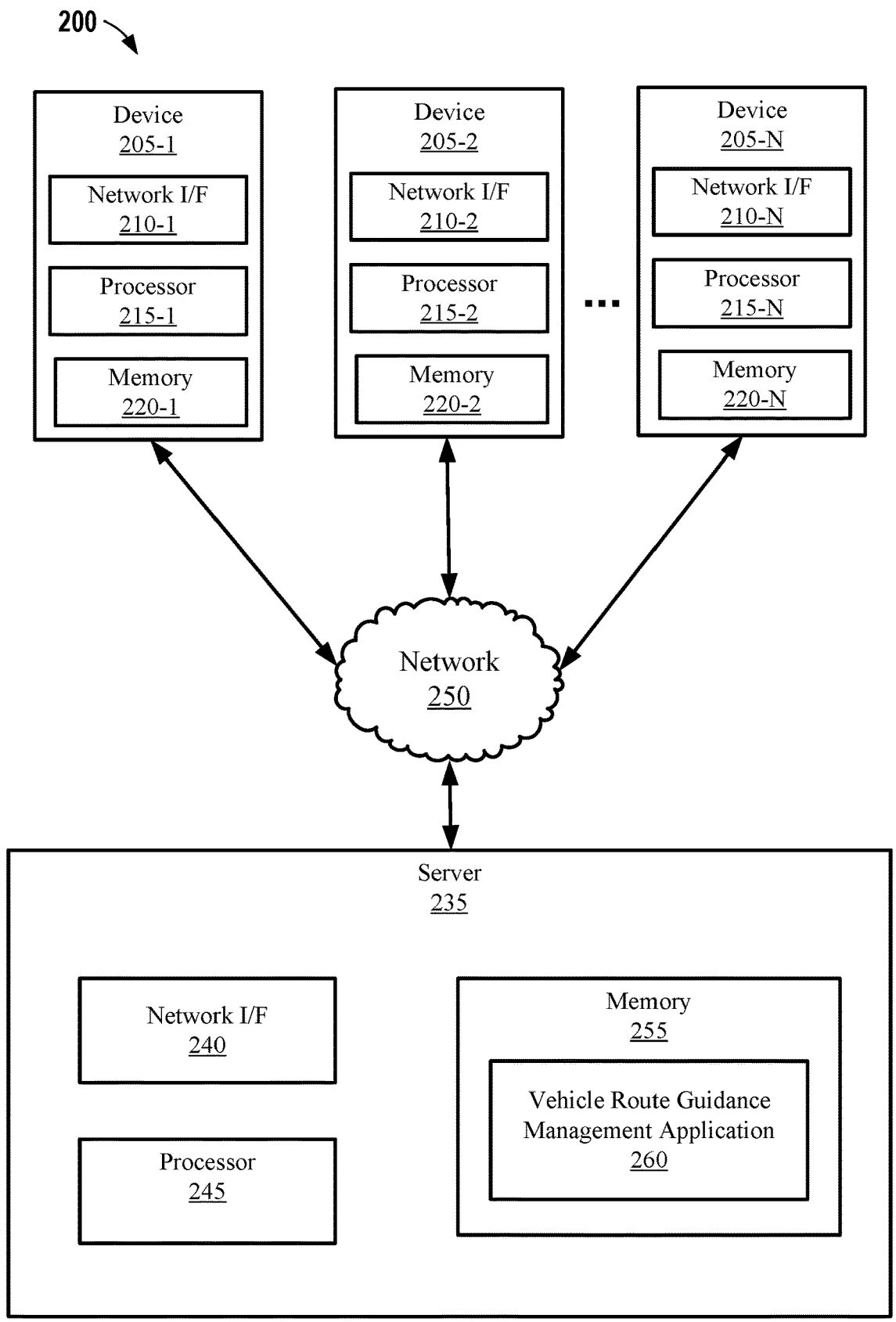
FIG. 2 is a block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2, . . . , 205-N (collectively devices 205), at least one server 235, and a network 250.

The devices 205 and the server 235 include one or more processors 215-1, 215-2, . . . 215-N (collectively processors 215) and 245 and one or more memories 220-1, 220-2, . . . , 220-N (collectively memories 220) and 255, respectively. The processors 215 and 245 can be the same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2, . . . , 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, augmented reality/virtual reality (AR/VR) software, etc.). For example, devices 205 and/or server 235 can be, or include, components/devices such as those described with respect to peripheral device set 114 of FIG. 1. The devices 205 and/or the server 235 can be servers, desktops, laptops, or hand-held devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a vehicle route guidance management application (VRGMA) 260. The VRGMA 260 can be configured to provide guidance (e.g., visual/audio guidance) and/or instructions (self-driving instructions) to a first vehicle (e.g., a following vehicle) to follow a second vehicle (e.g., a lead vehicle) during a currently overlapping section of navigation routes between the first and second vehicles.

The VRGMA 260 can be configured to receive navigation routes (e.g., navigation data) corresponding to vehicles for which vehicular route guidance management is to be performed. The navigation routes can be accessed as permitted by users of their vehicles. That is, users can opt-in to share navigation data associated with their routes such that route guidance management by the VRGMA 260 can be completed. In embodiments, only portions, sections, or snippets of the navigation routes may be required to be accessed by the VRGMA 260, as only a currently overlapping section between the navigation routes may be needed for vehicular route guidance management as described in embodiments of the present disclosure. As such, the entire navigation route to be traveled by each vehicle may not be necessary, preventing undesired oversharing of potentially sensitive data.

The navigation routes can be received from any suitable navigation system. A navigation system is a system that performs mapping and navigation functionalities such that route guidance can be provided to a user. Navigation systems can utilize global positioning system (GPS) technology, digital maps, sensors, and real-time data (e.g., traffic and weather data). In embodiments, navigation systems utilized by users can differ. That is, a first user of a first vehicle can use a first navigation system to calculate a first navigation route, while a second user of a second vehicle can use a second navigation system to calculate a second navigation route. Use of different navigation systems by different vehicles does not preclude vehicular route guidance management as described in embodiments of the present disclosure.

The collection of navigation routes by the VRGMA 260 can occur in response to a condition. In embodiments, collection of navigation routes can occur in response to a proximity threshold between two vehicles being satisfied. That is, in response to a first vehicle entering a particular distance (e.g., satisfying a proximity threshold) with respect to a second vehicle, navigation routes of each vehicle can be obtained. However, navigation routes can be collected responsive to any other suitable condition. For example, in embodiments, upon user opt-in to functionalities of the VRGMA 260, navigation routes can be automatically collected.

The VRGMA 260 receives a first navigation route of a first vehicle and a second navigation route of a second vehicle. The VRGMA 260 can then compare the first navigation route and the second navigation route to determine whether there is a currently overlapping section between the first and second navigation routes. If there are no currently overlapping sections between the first and second navigation routes, then functionalities for providing guidance/instructions may not be performed by VRGMA 260. If there is a currently overlapping section between the first and second navigation routes, then the VRGMA 260 can be configured to provide guidance and/or instructions to the first vehicle (e.g., the following vehicle) to follow the second vehicle (e.g., the lead vehicle) during the overlapping section between the first and second navigation routes. A "currently overlapping section" refers to a section between the first navigation route and the second navigation route that coincides and is occurring at a current point in time such that the first vehicle can follow the second vehicle during the currently overlapping section without departing from their navigation route.

In some embodiments, even if there is a currently overlapping section between the first navigation route and second navigation route, providing guidance/instructions for the first vehicle to follow the second vehicle may not be completed. For example, prior to providing guidance/instructions for following, a determination can be made whether the first vehicle should follow the second vehicle. In some embodiments, this determination is completed based on whether the second vehicle has a reliability score exceeding a reliability threshold. Reliability of the second vehicle can depend on historical route data of the second vehicle. For example, if the second vehicle routinely changes routes during navigation (e.g., based on missing navigation instructions and/or entering new routes to their navigation system), the second vehicle may have a relatively low reliability score. Vehicles with relatively low reliability scores may be unreliable candidates to be followed, as their route is more likely to change during navigation.

However, in some embodiments, other criteria can be considered for determining whether the first vehicle should follow the second vehicle. For example, determining whether the first vehicle should follow the second vehicle can additionally or alternatively depend on driving tendency classifications of the first and second vehicles (e.g., based on historical driving data). As an example, if the second vehicle (e.g., lead vehicle) has an aggressive driving tendency classification (e.g., routinely exceeds the speed limit, makes rapid changes, etc. as indicated in historical driving data of the second vehicle) compared to the first vehicle, then a determination can be made that the first vehicle should not follow the second vehicle. As such, determining whether the first vehicle should follow the second vehicle may be completed not only based on whether there is a currently overlapping section between their navigation routes, but also based on the second vehicle's reliability and/or driving tendency classifications between the first and second vehicles.

Responsive to determining that there is a currently overlapping section and/or that the first vehicle should follow the second vehicle, guidance and/or instructions can be provided to the first vehicle for following the second vehicle. Guidance data can be provided to a display of the first vehicle (e.g., or a display possessed by a user of the first vehicle which is not necessarily integrated with the first vehicle) guiding the user of the first vehicle to follow the second vehicle via visual and/or audio data. As such, guidance can be provided in situations where the first vehicle does not have autonomous or semi-autonomous driving capabilities. That is, the user may be required to take driving actions to follow the second vehicle. However, guidance can also be provided in situations where the first vehicle does have autonomous or semi-autonomous capabilities.

Providing instructions (e.g., a command or self-driving instructions) to the first vehicle for following the second vehicle can include issuing a command to the first vehicle to automatically follow the second vehicle using autonomous vehicle capabilities. Thus, providing instructions for the first vehicle to follow the second vehicle can be completed in situations where the first vehicle has autonomous or semi-autonomous driving capabilities.

Providing guidance to the first vehicle for following the second vehicle can be completed in various manners. In embodiments, VRGMA 260 is configured to cause guidance data guiding a user of the first vehicle to follow the second vehicle to be displayed on a display of the first vehicle. The display can vary and can be any suitable audio/video (A/V) output system. For example, guidance data can be provided via an integrated vehicle display, a mobile device, a wearable, a heads-up display, an extended reality (XR) (e.g., augmented reality (AR) or virtual reality (VR)) device, and/or a speaker, among other potential A/V output systems. The guidance data can guide the user of the first vehicle to follow the second vehicle during the currently overlapping section between the first and second navigation routes. The guidance data can include graphics (e.g., arrows, lines, or other directional indicators) for lane changing guidance, following distance guidance, turning guidance, and other potential vehicular actions. In embodiments, the visual guidance data includes a bounding box or other visual indicator (e.g., displayed on a heads-up display of the vehicle or XR device worn by the user) encompassing the second vehicle, such that the user of the first vehicle can readily ascertain the vehicle they are guided to follow. The guidance data can additionally or alternatively include audio instructions for specific vehicular actions for following the second vehicle. This can enable the user of the first vehicle to follow the second vehicle during the overlapping section of routes, without requiring the user to necessarily follow their specific navigation route (e.g., the guidance pertains to following the second vehicle, and not the first navigation route). As discussed herein, "a display of the first vehicle" does not necessarily have to be a display that is integrated with the first vehicle. Rather, the display of the first vehicle can be possessed by a user (e.g., a wearable, mobile device, or other mobile computing system) of the first vehicle.

Providing instructions to the first vehicle for following the second vehicle can include providing self-driving instructions enabling the first vehicle to follow the second vehicle. That is, an advanced control system of the first vehicle can be instructed to follow the second vehicle. Thereafter, the advanced control system can be configured to analyze sensor data collected by the first vehicle such that the second vehicle can be followed with no or reduced user intervention. Thus, the instructions for the first vehicle to follow the second vehicle do not require following the first navigation route, but rather, the second vehicle.

Upon determining that the currently overlapping section of routes between the first vehicle and second vehicle ends, then the VRGMA 260 can be configured to stop providing guidance and/or instructions to the first vehicle to follow the second vehicle. In embodiments, if the second vehicle changes routes during navigation while the first vehicle is following the second vehicle, a determination can be made that the currently overlapping section ends. Monitoring by the VRGMA 260 can continue to be completed such that consideration of one or more additional vehicles to be followed can be completed while the first vehicle travels its navigation route. In embodiments, upon the currently overlapping section of routes ending, a notification can be provided to the user of the first vehicle indicating that the overlapping section has ended. Further, the notification can include an indication that the first vehicle should continue to follow the first navigation route and not the second vehicle.

It is noted that FIG. 2 is intended to depict the representative major components of an example computing environment 200. In some embodiments, however, individual components can have greater or lesser complexity than as represented in FIG. 2, components other than, or in addition to, those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., navigation route data, historical route data, historical driving data), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
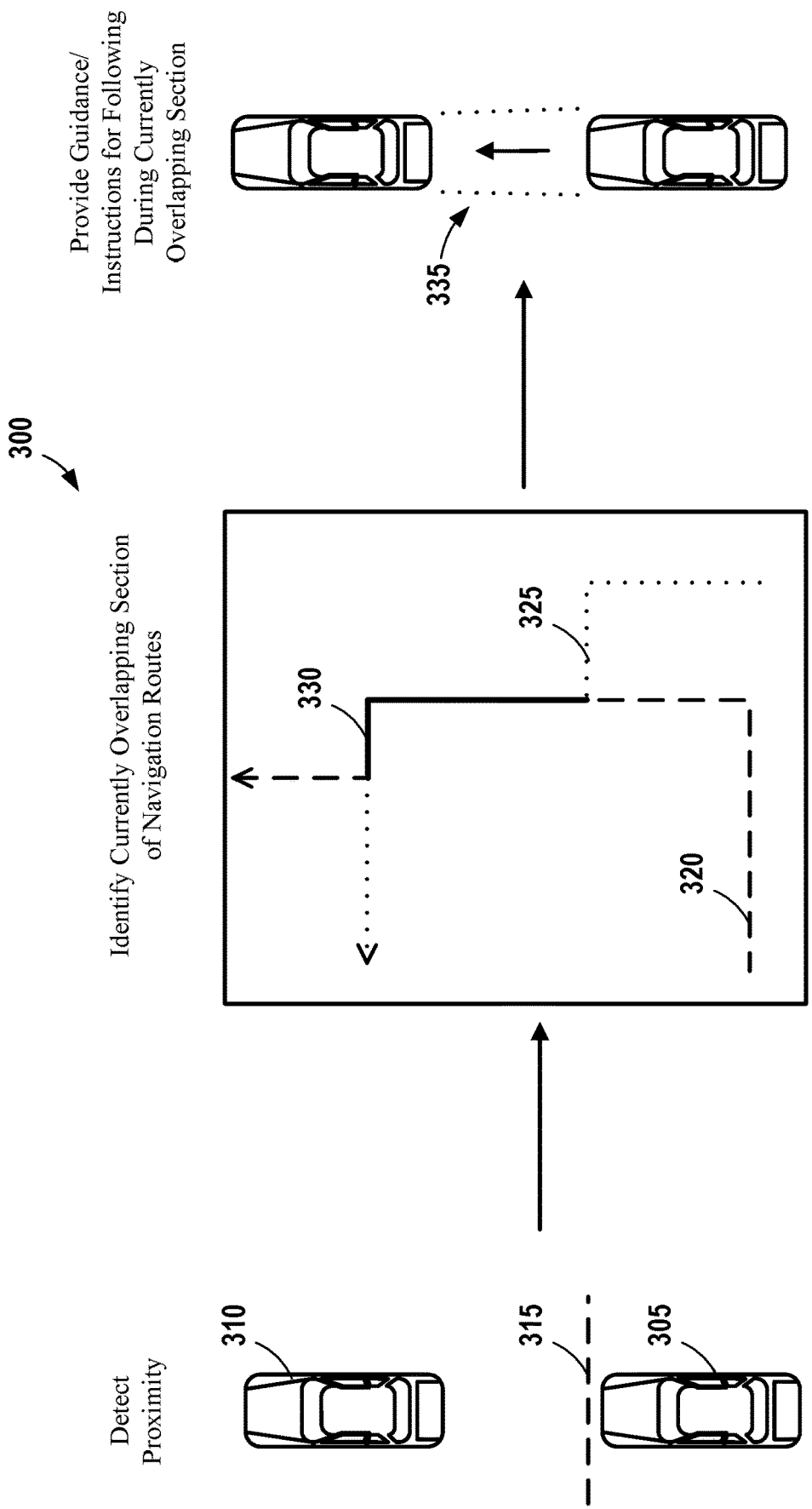
FIG. 3 is a diagram depicting operations of vehicle navigation route guidance management, in accordance with embodiments of the present disclosure.

Referring now to FIG. 3, shown is a diagram 300 depicting aspects of vehicle route guidance management, in accordance with embodiments of the present disclosure. As depicted in FIG. 3, a first vehicle 305 begins to enter (e.g., satisfy) a proximity threshold 315 of a second vehicle 310. Responsive to the first vehicle 305 satisfying the proximity threshold 315 of the second vehicle 310, a first navigation route 320 of the first vehicle 305 and a second navigation route 325 of the second vehicle 310 can be collected. In embodiments, only the second navigation route 325 of the second vehicle 310 may be collected in response to the first vehicle 305 satisfying the proximity threshold 315. This may occur because the first navigation route 320 may have already been collected at an earlier point in time. In some embodiments, a user of the second vehicle 310 is alerted that the first vehicle 305 satisfied the proximity threshold 315 and that the user of the first vehicle 305 desires to follow their vehicle via vehicle route guidance management functionalities. The user of the second vehicle 310 can then determine whether they consent to the system accessing their navigation route data such that the first vehicle 305 can follow their vehicle (e.g., the second vehicle 310).

The proximity threshold 315 can be any suitable distance between the first vehicle 305 and second vehicle 310. The proximity threshold can be defined based on the first vehicle 305 (e.g., an area encompassing the first vehicle 305 or a horizontal line in front of the first vehicle 305) or the second vehicle (e.g., an area encompassing the second vehicle 310 or a horizontal line behind the second vehicle 310). However, any suitable proximity threshold (e.g., distance threshold) can be implemented between the first and second vehicles 305, 310 without departing from the spirit and scope of the present disclosure. The proximity threshold 315 can be represented by any suitable geometric boundary. Proximity between first and second vehicles can be determined using vehicular sensors, environmental Internet of Things (IoT) sensors, and/or devices associated with the first and/or second vehicles. For example, proximity can be determined using computer vision based on sensor data received from cameras.

In embodiments, prior to obtaining navigation routes of the first vehicle 305 and the second vehicle 310, but after determining that the proximity threshold has been satisfied, a determination can be made whether the first vehicle 305 should follow the second vehicle 310. This can be completed based on reliability of the second vehicle 310 and/or a comparison of driving tendencies between the first vehicle 305 and second vehicle 310, discussed with respect to FIGS. 2 and 4.

The first navigation route 320 of the first vehicle 305 is compared to the second navigation route 325 of the second vehicle 310. Based on the comparison, a currently overlapping section 330 between the first navigation route 320 and second navigation route 325 is determined.

Upon determining the currently overlapping section 330 between the first navigation route 320 and second navigation route 325, the first vehicle 305 is provided guidance and/or instructions for following the second vehicle 310 during the currently overlapping section 330. Thus, visual/audio guidance data can be provided to a display of the first vehicle 305 for following the second vehicle 310 during the currently overlapping section 330. Additionally or alternatively (e.g., based on whether the first vehicle 305 has autonomous or semi-autonomous driving capabilities), instructions can be provided to the first vehicle 305 for automatically following the second vehicle via autonomous driving capabilities.

It is noted that FIG. 3 is intended to depict the representative operations of vehicular route guidance management. In some embodiments, however, individual operations can have greater or lesser complexity than as represented in FIG. 3, operations other than, or in addition to, those shown in FIG. 3 can be present, and the number, type, and configuration of such operations can vary.

Figure 4:
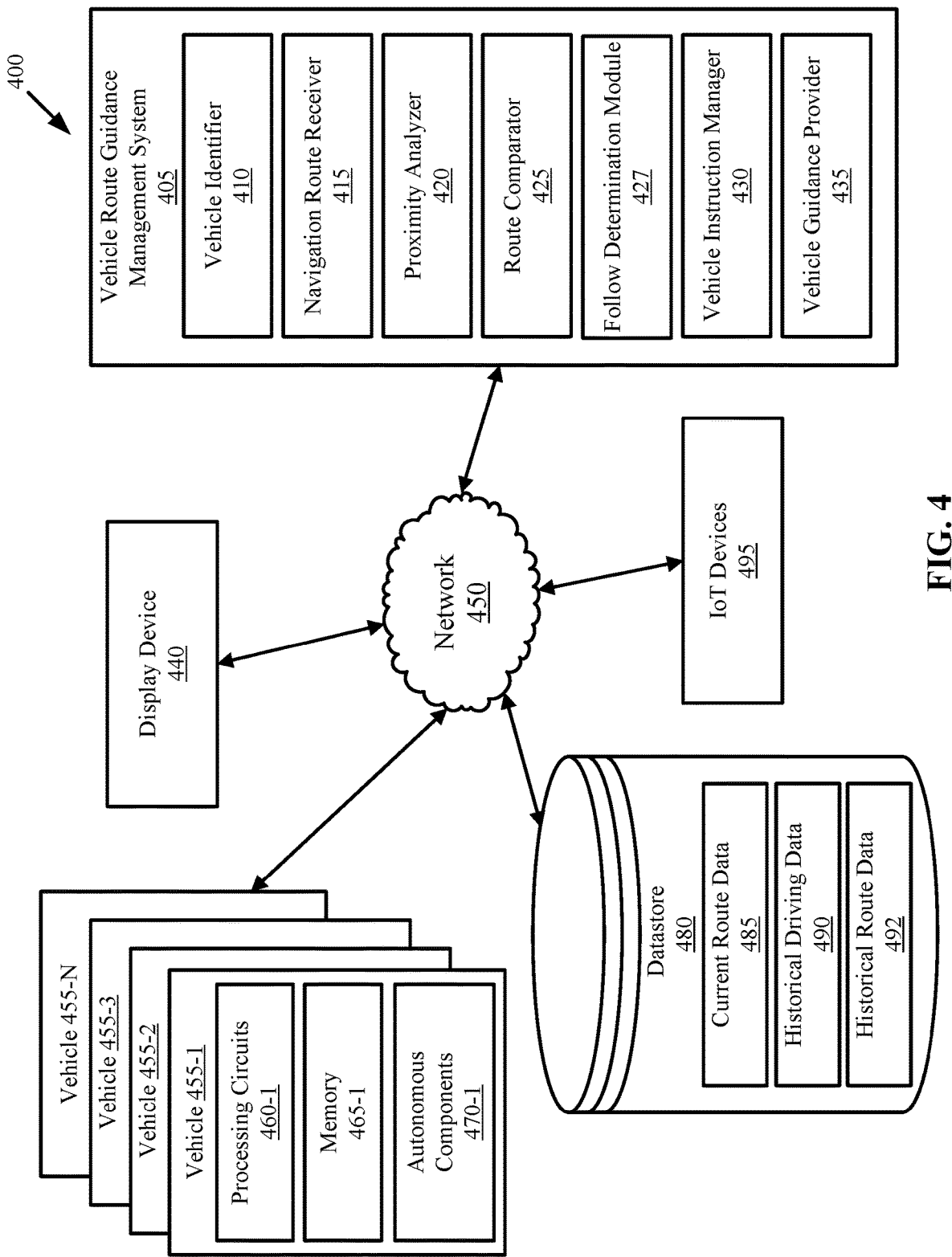
FIG. 4 is a block diagram illustrating an example network environment including a vehicle route guidance management system, in accordance with embodiments of the present disclosure.

Referring now to FIG. 4, shown is a block diagram illustrating an example network environment 400 in which illustrative embodiments of the present disclosure can be implemented. The network environment 400 includes a vehicle route guidance management system (VRGMS) 405, a display device 440, vehicles 455-1, 455-2, 455-3 . . . 455-N (e.g., collectively vehicles 455), a datastore 480, and IoT devices 495, each of which can be communicatively coupled for intercomponent interaction via a network 450. In embodiments, the network 450 can be the same as, or substantially similar to, network 250 and/or WAN 102. In embodiments, the VRGMS 405, display device 440, vehicles 455, and/or IoT devices 495 can be the same as, or substantially similar to, computer 101, peripheral device set 114, end user device 103, devices 205, and/or server 235.

The VRGMS 405 can be configured to provide guidance and/or instructions to a first vehicle (e.g., vehicle 455-1) to follow a second vehicle (e.g., vehicle 455-2) during a currently overlapping section of navigation routes between the first vehicle and the second vehicle.

Vehicles 455 can comprise manual, semi-autonomous, or fully autonomous vehicles. Vehicles 455 can be a sedan, sport-utility-vehicle (SUV), truck, bus, all-terrain vehicle (ATV), aerial vehicle (e.g., plane, helicopter, quadcopter, etc.), train, ship (e.g., ferry, cruise liner, etc.), or a different form of vehicular transport. Implementation for vehicle route guidance by VRGMS 405 can depend on the type of vehicles 455 implemented. For example, navigation routes for marine and/or air vehicles can similarly be received and compared to determine a currently overlapping section of routes. However, marine and/or air vehicles may consider 3-dimensional data.

Vehicles 455 can have autonomous capabilities. For example, vehicles 455 can include self-driving instructions which dictate various traffic rules that the vehicles 455 must follow while traveling. For example, self-driving instructions can include lane rules (e.g., specifying the correct side of the road, specifying that the car should remain in the center of a lane, etc.), light/signage rules (e.g., stop light rules, construction zone rules, school zone rules, yield, stop sign rules, etc.), acceleration/speed rules, situational rules (e.g., stopping during a school bus drop off, no right turns around a city bus), priority rules (e.g., yielding priority with multiple cars at an intersection), etc. In embodiments, the self-driving instructions depend on the applicable traffic rules in the jurisdiction where the vehicles 455 are operating. For example, traffic rules in the United States differ from traffic rules in the United Kingdom (e.g., right vs. left-handed traffic).

To follow the traffic rules set forth in the self-driving instructions, the vehicle 455-1 includes processing circuits 460-1 (e.g., collectively processing circuits 460 when referring to vehicles 455), memory 465-1 (e.g., collectively memories 465 when referring to vehicles 455), and/or autonomous components 470-1 (collectively autonomous components 470 when referring to vehicles 455). The autonomous components 470 can include sensors and control systems. The sensors can continuously collect sensor data while the vehicles 455 are operating, and the sensor data can be used to control the vehicles 455 (e.g., using proportional-integral-derivative (PID) control) by the one or more processing circuits 460 (e.g., as analyzed by a control system) of the vehicles 455. The sensors can include, but are not limited to, radar, computer vision, lidar, sonar, global positioning system (GPS), odometry, and inertial measurement units (IMUs). For example, computer vision may be used to recognize signage, brake lights, buses, traffic lines, etc., lidar can be used for object detection and avoidance, and GPS can be used for navigation routing. Generally, processing circuits 460 of vehicles 455 respond to the data collected by the sensors of autonomous components 470 to comply with the self-driving instructions. As discussed above, autonomous components 470 are not necessary for each vehicle 455. That is, guidance (e.g., and not self-driving instructions) can be provided on a display of a vehicle if autonomous capabilities are not present.

The display device 440 can include a processor (not shown), a memory (not shown), and a display (not shown) for displaying content. In embodiments, the display device 440 can be integrated within a vehicle 455-1. In embodiments, the display device 440 can be possessed by a user of vehicle 455-1. The display device 440 can display video content on a display and/or output audio content via a speaker. Any suitable display device can be implemented, including a heads-up display (HUD), integrated vehicular display (e.g., a navigation system), a mobile device, a tablet, a wearable, an XR device, or other display. The display device 440 can include any devices described with respect to FIGS. 1-3. For example, display device 440 can include wearable devices, tablets, laptops, desktop computers, XR devices, gaming devices, financial terminals, and mobile devices (e.g., smart phones), among others.

In embodiments, the display device 440 is a heads-up display of a vehicle 455-1. A heads-up display, also known as an HUD or Head-up Guidance System, is a transparent display that displays data without requiring users to look away from their usual viewpoints. Any suitable heads-up display technology can be utilized without departing from the spirit and scope of the present disclosure, including, but not limited to, LED-based HUD, an optical waveguide-based HUD, or a scanning laser HUD. HUDs can implement liquid crystal displays (LCDs) digital micro-mirrors (DMDs), and/or organic light-emitting diodes (OLEDs). This enables a user of the first vehicle to be able to drive safely while following guidance data provided by the VRGMS 405.

IoT devices 495 can include various sensors in vehicular environments that can collect sensor data that can be utilized for performing one or more functions within environment 400. For example, IoT devices 495, can include, among other potential sensors, traffic cameras, weather sensors, and sensors of other vehicles (e.g., within a vehicle-to-vehicle network).

Datastore 480 can store current route data 485 which can comprise current navigation route data of vehicles 455 traveling from starting points to destinations. The current route data 485 can be received from any suitable navigation system.

Datastore 480 can additionally store historical driving data 490. Historical driving data 490 can indicate driving tendencies of vehicles 455. For example, historical driving data 490 can indicate historical speeds of vehicles 455 in specific scenarios, historical lane changes by vehicles 455 on specific routes, historical brake usage (e.g., deceleration data) of vehicles 455, and historical acceleration data (e.g., how often vehicles 455 accelerate and the magnitude of acceleration) of vehicles 455. The above historical driving data 490 can be collected in response to user opt-in (e.g., user consent) and can be used to build driving profiles for vehicles indicating classifications of the vehicles' driving tendencies. The driving tendency classifications can be used to determine whether vehicles are suitable to be followed by other vehicles (e.g., based on a comparison of their driving tendency classifications). Exemplary driving tendency classifications include "aggressive" (e.g., high magnitude acceleration, rapid deceleration, frequent lane changes, relatively high speeds as compared to speed limits), "moderate" (e.g., moderate magnitude acceleration, moderate deceleration, moderate lane changes, and moderate speeds compared to speed limits), and "passive" (e.g., low magnitude acceleration, gradual deceleration, infrequent lane changes, and slow speeds compared to speed limits). However, other driving tendency classifications can be implemented without departing from the spirit and scope of the present disclosure.

Historical route data 492 can indicate historical routes taken by vehicles 455 and updates/changes to routes made over time. This can indicate how often (e.g., a frequency) vehicles 455 change their route, for use in determining reliability scores of vehicles. For example, a first vehicle which routinely changes routes during navigation (e.g., a high frequency for changing routes during navigation) can have a relatively lower reliability score than a second vehicle that infrequently changes routes during navigation (e.g., a low frequency for changing routes during navigation). As such, the first vehicle may be determined to be a better candidate for following than the second vehicle based on a reliability score comparison (e.g., to a threshold reliability score). Reliability score can be represented by a numerical value (e.g., 0-1, 0-10, 0-100, etc.) where the magnitude of the numerical value indicates the relative reliability (e.g., a 1/100 reliability score indicates that a vehicle has low reliability while a 100/100 reliability score indicates that the vehicle has a high reliability). However, any suitable numerical ranges and/or mappings between reliability magnitudes and reliability can be implemented without departing from the spirit and scope of the present disclosure (e.g., in some implementations, 0/100 can indicate high reliability while 100/100 can indicate low reliability). As an example calculation, assuming a reliability range from 0-100, if a vehicle changes routes mid-navigation 50% of the time (e.g., a 50% route change frequency), that vehicle's reliability score can be calculated as 50/100. However, any suitable manner for calculating a reliability score based on observed route changes mid-navigation can be implemented.

The vehicle route guidance management system 405 includes a vehicle identifier 410, a navigation route receiver 415, a proximity analyzer 420, a route comparator 425, a follow determination module 427, a vehicle instruction manager 430, and a vehicle guidance provider 435. The functionalities of the vehicle identifier 410, navigation route receiver 415, proximity analyzer 420, route comparator 425, follow determination module 427, vehicle instruction manager 430, and a vehicle guidance provider 435 can be processor-executable instructions that can be executed by a dedicated or shared processor using received inputs.

The vehicle identifier 410 can be configured to identify a vehicle (e.g., a first vehicle, vehicle 455-1) for which route guidance management is to be completed. The first vehicle can be identified based on a request from a user. That is, the user may desire to enable functionalities of the VRGMS 405 and issue a request/command to initiate vehicular route guidance management. The vehicle identifier 410 can also be configured to identify vehicles 455 over network 450 based on an established communication. Further, vehicle identifier 410 can identify vehicles that a user encounters while traveling and while VRGMS 405 functionalities are activated via vehicular sensors (e.g., computer vision from integrated vehicular sensors).

Navigation route receiver 415 can be configured to receive navigation routes from vehicles 455. The navigation routes can be received from current route data 485 as generated by respective navigation systems on a push or pull basis. Navigation systems can be configured to calculate a route between a starting point and a destination using a digital map, GPS data, sensor data, and/or current conditions (e.g., traffic and weather conditions). Any suitable algorithms can be used for route determination (e.g., a shortest path based on current conditions, a path excluding certain navigation paths, a path excluding certain geographies or weather events, etc.). Any suitable navigation system can be implemented without departing from the spirit and scope of the present disclosure. Further, navigation routes can be received in response to any suitable condition (e.g., based on a satisfied proximity threshold, based on a determination that a first vehicle should follow a second vehicle by follow determination module 427).

Proximity analyzer 420 can be configured to determine whether the first vehicle satisfies a proximity threshold with respect to a second vehicle. As discussed with respect to FIG. 3, any suitable proximity threshold (e.g., any distance and/or geometric boundary) can be implemented. Proximity between first and second vehicles can be determined using vehicular sensors (e.g., autonomous components 470-1), environmental Internet of Things (IoT) sensors (e.g., of IoT devices 495), and/or devices associated with the first and/or second vehicles (e.g., display device 440). For example, proximity can be determined using computer vision based on sensor data received from cameras within environment 400.

In embodiments, responsive to determining that a proximity threshold is satisfied between a first and second vehicle, route data can be retrieved by navigation route receiver 415, routes can be compared by route comparator 425, and/or a determination can be made whether a first vehicle should follow a second vehicle by follow determination module 427. Thus, various functionalities of the VRGMS 405 can be triggered in response to a proximity threshold between two vehicles being satisfied. In embodiments, proximity analysis by the proximity analyzer 420 does not necessarily have to be completed.

Route comparator 425 is configured to compare a first navigation route of a first vehicle to a second navigation route of a second vehicle to identify a currently overlapping section. Comparing the first navigation route to the second navigation route can be completed by identifying shared navigation paths between the first and second routes and determining whether any shared navigation paths are currently ongoing. If any shared navigation paths are currently ongoing, then a determination can be made that there is a currently overlapping section of routes between the first and second navigation routes. In embodiments, if no currently overlapping section is identified based on comparison by the route comparator, then VRGMS 405 functionalities can end. In embodiments, if route comparator 425 identifies a currently overlapping section between the first and second navigation routes, then a determination can be made that the first vehicle should follow the second vehicle. In embodiments, identifying the overlapping section of routes can trigger a determination of whether the first vehicle should follow the second vehicle via follow determination module 427.

The follow determination module 427 can be configured to determine whether the first vehicle should follow the second vehicle. Determining that the first vehicle should follow the second vehicle can be completed in any suitable manner. For example, determining whether the first vehicle should follow the second vehicle can be completed based on historical driving data 490 and/or historical route data 492.

As discussed above, driving tendencies of particular vehicles can be classified based on historical driving data 490. For example, driving tendency classifications can include "aggressive," "moderate," "passive," and others. In embodiments, if there is a mismatch between driving tendency classifications between a first vehicle and a second vehicle, a determination can be made that the first vehicle should not follow the second vehicle, due to their relatively different driving tendencies. As an example, if a second vehicle has an "aggressive" driving tendency classification and a first vehicle has a "passive" driving tendency classification, then follow determination module 427 can be configured to determine that the first vehicle should not follow the second vehicle, thereby preventing guidance/instructions being transmitted to the first vehicle to follow the second vehicle. As such, aspects of the present disclosure recognize that a driving tendency classification of each vehicle can be determined based on historical driving data 490 and compared to determine whether the first vehicle should follow the second vehicle.

As also discussed above, reliability of particular vehicles can be determined based on historical route data 492. The reliability score represents the respective vehicle's compliance with pre-defined navigation routes. If a particular vehicle frequently changes routes during navigation, then a relatively low reliability score can be determined for that vehicle. In contrast, if a vehicle infrequently changes routes during navigation, then a relatively high reliability score can be determined for that vehicle. In embodiments, the follow determination module 427 can determine whether the first vehicle should follow the second vehicle based on comparison of the second vehicle's reliability score to a reliability score threshold. As an example, if the second vehicle's reliability score is calculated as 60/100, and a reliability score threshold is set to 50/100 such that any vehicle with a reliability score less than 50 is determined to not be a candidate for following, then the follow determination module 427 can determine that the first vehicle should follow the second vehicle based on the reliability score of the second vehicle satisfying (e.g., exceeding) the reliability score threshold. As such, aspects of the present disclosure recognize that a reliability score of the second vehicle (e.g., lead vehicle) can be determined and compared to a reliability score threshold. Responsive to the reliability score not satisfying the reliability score threshold, a determination can be made that the first vehicle should not follow the second vehicle. Responsive to the reliability score satisfying the reliability score threshold, a determination can be made that the first vehicle should follow the second vehicle.

Responsive to determining that there is a currently overlapping section of routes between the first vehicle and second vehicle (e.g., by route comparator 425), responsive to determining that a proximity threshold is satisfied (e.g., by proximity analyzer 420), and/or responsive to determining that the first vehicle should follow the second vehicle (e.g., by follow determination module 427), vehicle instruction manager 430 can be configured to provide instructions to the first vehicle to follow the second vehicle and/or vehicle guidance provider 435 can be configured to provide guidance data to display of the first vehicle guiding the first vehicle to follow the second vehicle.

The vehicle instruction manager 430 can be configured to provide instructions (e.g., a command or self-driving instructions) to the first vehicle for following the second vehicle. This can include issuing a command to the first vehicle to automatically follow the second vehicle using autonomous vehicle capabilities. Thus, providing instructions for the first vehicle to follow the second vehicle can be completed in situations where the first vehicle has autonomous or semi-autonomous driving capabilities. In embodiments, an advanced control system of the first vehicle can be instructed to follow the second vehicle. Thereafter, the advanced control system of the first vehicle can be configured to analyze sensor data collected by the first vehicle such that the second vehicle can be followed with no or reduced user intervention. Thus, the instructions for the first vehicle to follow the second vehicle do not require following the first navigation route, but rather, the second vehicle.

The vehicle guidance provider 435 can be configured to cause guidance data to be displayed on a display (e.g., display 440) of the first vehicle guiding the user of the first vehicle to follow the second vehicle via visual and/or audio data. As such, guidance can be provided in situations where the first vehicle does not have autonomous or semi-autonomous driving capabilities. That is, the user may be required to take driving actions to follow the second vehicle. However, guidance can also be provided in situations where the first vehicle does have autonomous or semi-autonomous capabilities.

Providing guidance to the first vehicle for following the second vehicle can be completed in various manners. The guidance data can guide the user of the first vehicle to follow the second vehicle during the currently overlapping section between the first and second navigation routes. The guidance data can include graphics (e.g., arrows, lines, or other directional indicators) for lane changing guidance, following distance guidance, for turning guidance, and other potential vehicular actions. In embodiments, the visual guidance data includes a bounding box (e.g., displayed on a heads-up display of the vehicle or XR device worn by the user, e.g., display device 440) encompassing the second vehicle, such that the user of the first vehicle can readily ascertain the vehicle they are guided to follow. However, the second vehicle (e.g., lead vehicle) can be visually indicated on the display 440 in any other suitable manner. For example, the second vehicle can be outlined (e.g., pixels on an outline of the vehicle can be altered to a brighter or otherwise more distinguishable color), highlighted (e.g., pixels encompassing the second vehicle can be altered to a brighter or otherwise more distinguishable color), or enlarged (e.g., pixels on the display can be altered to make the second vehicle appear larger on display 440). Thus, the guidance data can include a visual indicator indicating a position of the second vehicle on the display device 440 of the first vehicle.

The guidance data can additionally or alternatively include audio instructions for specific vehicular actions for following the second vehicle. For example, audio guidance data can include lane changing guidance, following distance guidance, turning guidance, and guidance for other potential vehicular actions. Guidance data can enable the user of the first vehicle to follow the second vehicle during the overlapping section of routes, without requiring the user to necessarily follow their specific navigation route (e.g., the guidance pertains to following the second vehicle, and not the first navigation route).

Upon determining that the currently overlapping section of routes between the first vehicle and second vehicle ends, the VRGMS 405 can be configured to stop providing guidance and/or instructions to the first vehicle to follow the second vehicle. In embodiments, if the second vehicle changes routes during navigation while the first vehicle is following the second vehicle, a determination can be made that the currently overlapping section ends. Monitoring by VRGMS 405 can continue to be completed such that consideration of one or more additional vehicles to be followed can be completed while the first vehicle travels its navigation route. In embodiments, upon the currently overlapping section of routes ending, a notification can be provided to the user of the first vehicle indicating that the overlapping section has ended. Further, the notification can include an indication that the first vehicle should continue to follow the first navigation route and not the second vehicle.

It is noted that FIG. 4 is intended to depict the representative major components of an example computing environment 400. In some embodiments, however, individual components can have greater or lesser complexity than as represented in FIG. 4, components other than or in addition to those shown in FIG. 4 can be present, and the number, type, and configuration of such components can vary.

Figure 5:
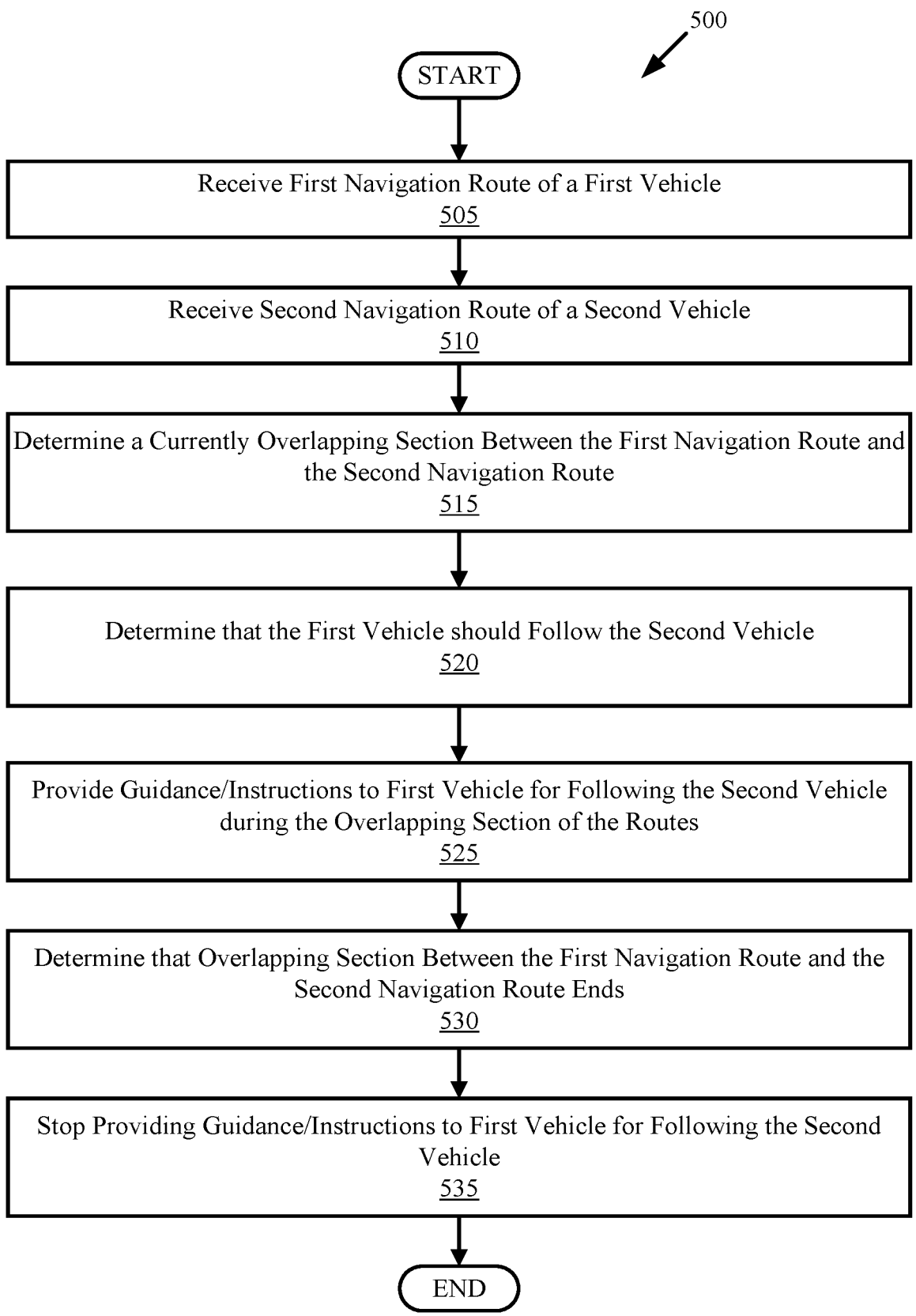
FIG. 5 is a flow-diagram illustrating an example method for vehicle navigation route guidance management, in accordance with embodiments of the present disclosure.

Referring now to FIG. 5, shown is a flow-diagram of an example method 500 for vehicle route guidance management, in accordance with embodiments of the present disclosure. One or more operations of method 500 can be completed by one or more processing circuits (e.g., computer 101, devices 205, server 235, vehicles 455, IoT devices 495, VRGMS 405, display device 440).

Method 500 initiates at operation 505, where a first navigation route of a first vehicle is received. At operation 510, a second navigation route of a second vehicle is received. The first navigation route of the first vehicle and/or second navigation route of the second vehicle can be received in response to user opt-in to functionalities for vehicle route guidance management. In some embodiments, the navigation routes can be obtained in response to a proximity threshold between the first vehicle and second vehicle being satisfied. However, the first navigation route and second navigation route can be received in response to any suitable condition.

A currently overlapping section between the first navigation route and the second navigation route is determined. This is illustrated at operation 515. Determining the overlapping section between the first and second navigation routes can be completed in the same, or a substantially similar manner, as described with respect to route comparator 425 of FIG. 4.

A determination is made that the first vehicle should follow the second vehicle. This is illustrated at operation 520. Determining that the first vehicle should follow the second vehicle can be completed in the same, or a substantially similar manner, as described with respect to the follow determination module 427 of FIG. 4. For example, determining that the first vehicle should follow the second vehicle can consider a reliability score of the second vehicle and/or a comparison between driving tendency classifications between the first and second vehicles.

Guidance and/or instructions are provided to the first vehicle for following the second vehicle during the overlapping section of routes. This is illustrated at operation 525. Providing guidance and/or instructions can be completed in the same, or a substantially similar manner, as described with respect to the vehicle instruction manager 430 and/or vehicle guidance provider 435 of FIG. 4.

A determination is made that the overlapping section between the first navigation route and the second navigation route ends. This is illustrated at operation 530. Guidance and/or instructions are no longer provided to the first vehicle for following the second vehicle. This is illustrated at operation 535.

The aforementioned operations can be completed in any order and are not limited to those described. Additionally, some, all, or none of the aforementioned operations can be completed, while still remaining within the spirit and scope of the present disclosure. For example, in some embodiments, operation 520 may not be completed.

Figure 6:
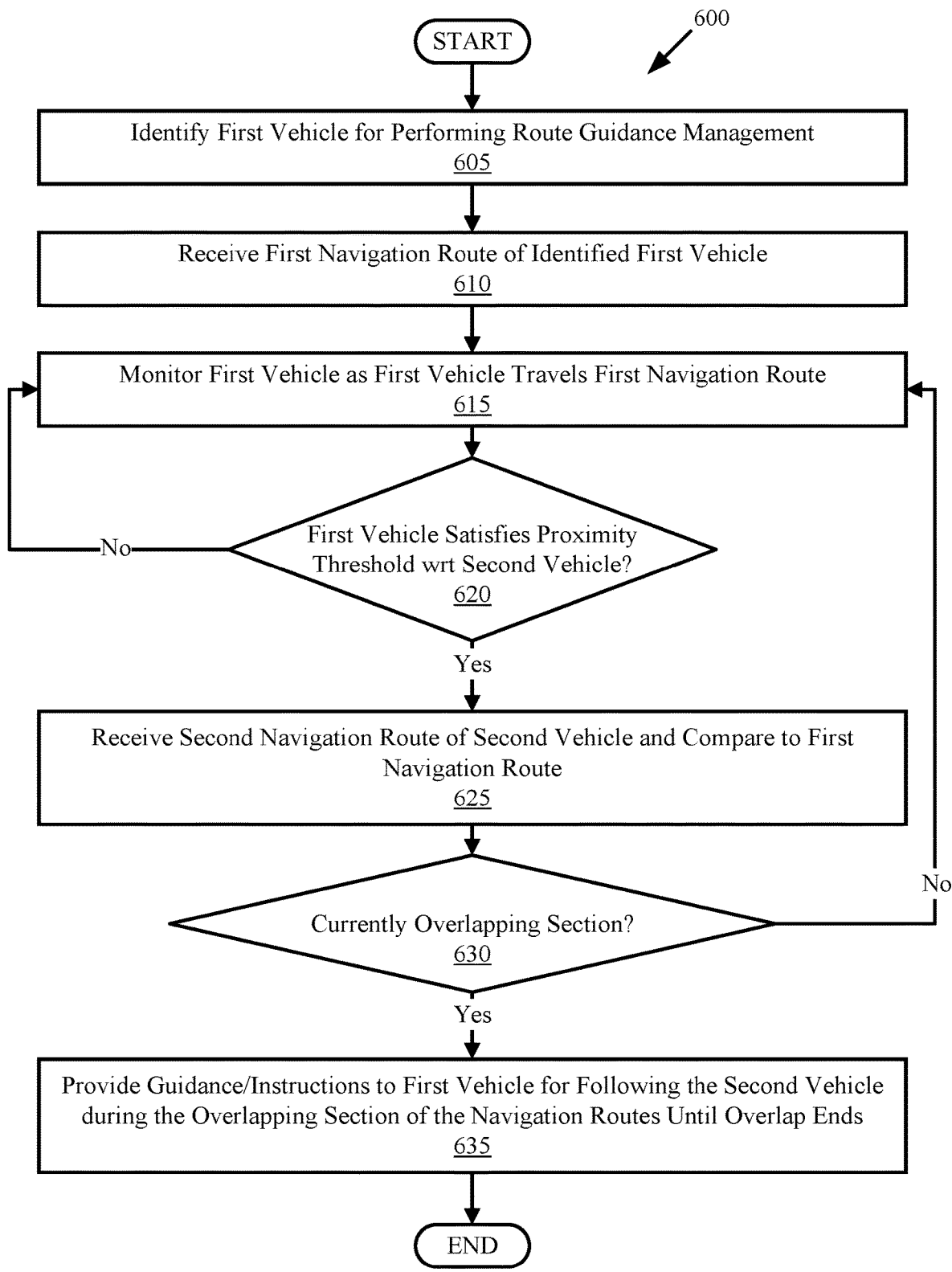
FIG. 6 is a flow-diagram illustrating another example method for vehicle navigation route guidance management, in accordance with embodiments of the present disclosure.

Referring now to FIG. 6, shown is a flow-diagram of another example method 600 for vehicle route guidance management, in accordance with embodiments of the present disclosure. One or more operations of method 600 can be completed by one or more processing circuits (e.g., computer 101, devices 205, server 235, vehicles 455, IoT devices 495, VRGMS 405, display device 440).

Method 600 initiates at operation 605, where a first vehicle for performing route guidance management is identified. In embodiments, the first vehicle can be identified in response to user opt-in to functionalities for vehicle route guidance management. A first navigation route of the identified first vehicle is received. This is illustrated at operation 610.

The first vehicle is monitored as it travels the first navigation route. This is illustrated at operation 615. Monitoring the first vehicle while the first vehicle is traveling its navigation route can include collection of integrated vehicular sensor data, collection of surrounding IoT sensor data, and/or collection of sensor data from one or more devices within the first vehicle. In embodiments, monitoring the first vehicle can include monitoring the first vehicle's proximity with respect to other vehicles in the vehicular environment.

A determination is made whether the first vehicle satisfies a proximity threshold with respect to a second vehicle. This is illustrated at operation 620. Determining whether the first vehicle satisfies the proximity threshold can be completed in the same, or a substantially similar manner, as described with respect to proximity analyzer 420 of FIG. 4.

If a determination is made that the first vehicle does not satisfy a proximity threshold with respect to a second vehicle, then the first vehicle can continue to be monitored at operation 615. If a determination is made that the first vehicle does satisfy the proximity threshold with respect to the second vehicle, then a second navigation route of the second vehicle is received and compared to the first navigation route. This is illustrated at operation 625.

A determination is made whether there is a currently overlapping section of routes between the first navigation route and second navigation route. This is illustrated at operation 630. If a determination is made that there is no currently overlapping section of routes between the first and second navigation routes, then the first vehicle can continue to be monitored at operation 615 to determine whether another vehicle should be followed. If a determination is made that there is a currently overlapping section of routes between the first and second navigation routes, then guidance and/or instructions are provided to the first vehicle for following the second vehicle during the currently overlapping section of routes. This is illustrated at operation 635. Providing guidance and/or instructions can be completed in the same, or a substantially similar manner, as described with respect to the vehicle instruction manager 430 and/or vehicle guidance provider 435 of FIG. 4.

The aforementioned operations can be completed in any order and are not limited to those described. Additionally, some, all, or none of the aforementioned operations can be completed, while still remaining within the spirit and scope of the present disclosure. For example, in some embodiments, operation 620 may not be completed (e.g., proximity analysis may not be completed).

Figure 7:
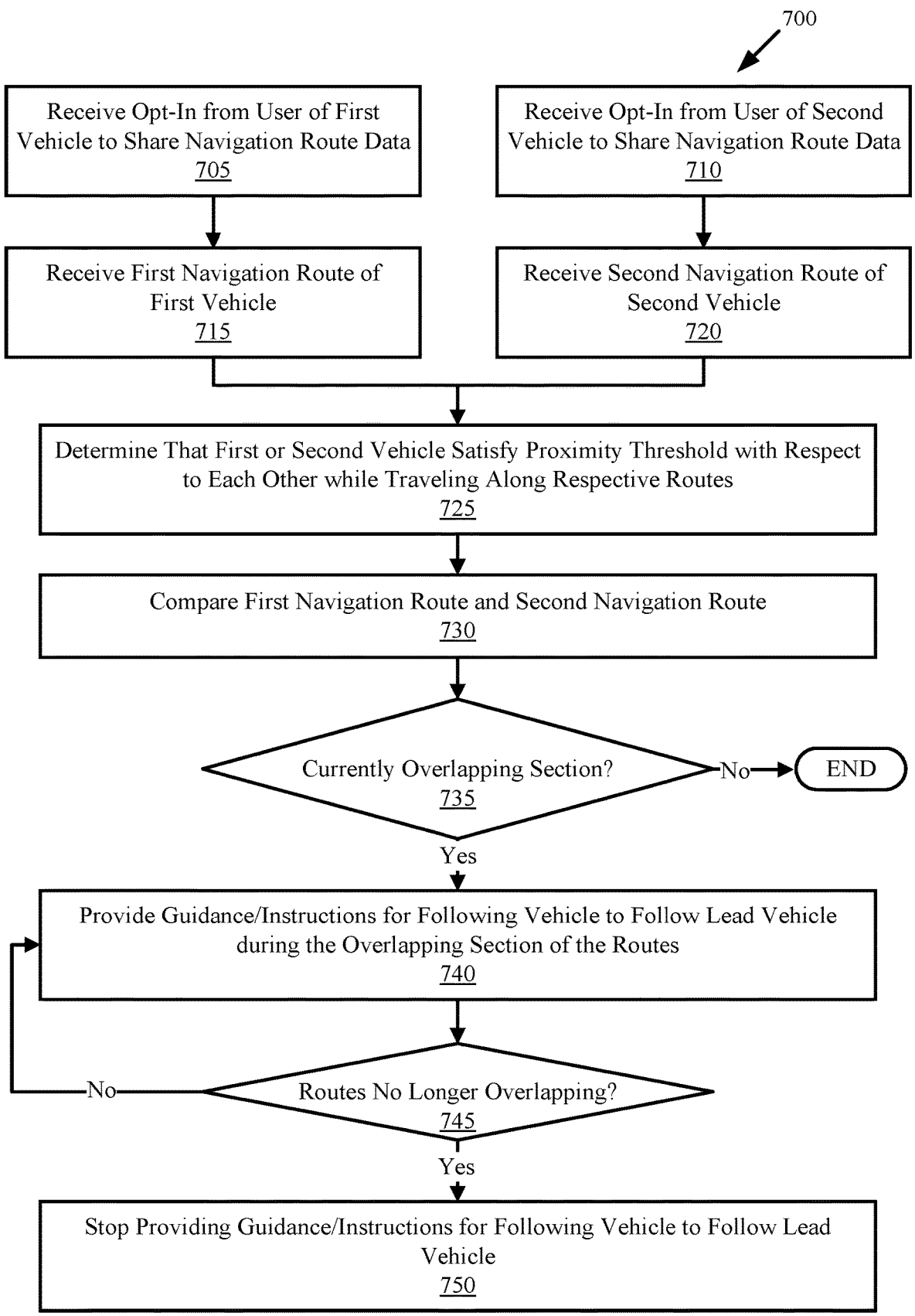
FIG. 7 is a flow-diagram illustrating another example method for vehicle navigation route guidance management, in accordance with embodiments of the present disclosure.

Referring now to FIG. 7, shown is a flow-diagram of another example method 700 for vehicle route guidance management, in accordance with embodiments of the present disclosure. One or more operations of method 700 can be completed by one or more processing circuits (e.g., computer 101, devices 205, server 235, vehicles 455, IoT devices 495, VRGMS 405, display device 440).

Method 700 initiates at operation 705, where opt-in from a user of a first vehicle to share navigation route data is received. At operation 710, opt-in from a user of a second vehicle to share navigation route data is received. A first navigation route of the first vehicle is received at operation 715. A second navigation route of the second vehicle is received at operation 720. The navigation routes can be received in the same, or a substantially similar manner, as described with respect to navigation route receiver 415 of FIG. 4.

A determination is made that the first or second vehicle satisfies a proximity threshold with respect to each other while traveling along their respective routes. This is illustrated at operation 725. Determining that the proximity threshold is satisfied can be completed in the same, or a substantially similar manner, as described with respect to the proximity analyzer 420 of FIG. 4.

The first navigation route and second navigation route are compared. This is illustrated at operation 730. Comparing the first and second navigation routes can be completed in the same, or a substantially similar manner, as described with respect to route comparator 425 of FIG. 4. A determination is made whether there is a currently overlapping section between the first navigation route and second navigation route. This is illustrated at operation 735. If no currently overlapping section of routes exists between the first and second navigation routes, then method 700 ends.

If there is a currently overlapping section of routes between the first and second navigation routes, then guidance and/or instructions are provided to the following vehicle for following the lead vehicle during the overlapping section of routes. This is illustrated at operation 740. Providing guidance and/or instructions can be completed in the same, or a substantially similar manner, as described with respect to the vehicle instruction manager 430 and/or vehicle guidance provider 435 of FIG. 4.

A determination is made whether the routes are no longer overlapping. This is illustrated at operation 745. If a determination is made that the routes are still overlapping, method 700 returns to operation 740 where guidance and/or instructions can continue to be provided to the following vehicle for following the lead vehicle. If a determination is made that the routes are no longer overlapping, then guidance and/or instructions for the following vehicle to follow the lead vehicle can stop being provided. This is illustrated at operation 750.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A computer-implemented method comprising:
   receiving a first navigation route of a first vehicle;
   receiving a second navigation route of a second vehicle;
   comparing the first navigation route to the second navigation route to determine a currently overlapping section between the first navigation route and the second navigation route;
   determining that the first vehicle should follow the second vehicle based on a reliability score of the second vehicle satisfying a reliability threshold, wherein the reliability score for the second vehicle is based on historical route data of the second vehicle;
   issuing a command to the first vehicle to automatically follow the second vehicle during the overlapping section between the first navigation route and the second navigation route, wherein the first vehicle utilizes real-time vehicular sensor data collected from one or more integrated vehicular sensors to automatically follow the second vehicle during the overlapping section; and
   causing guidance data depicting vehicular actions that the first vehicle takes to follow the second vehicle to be displayed on a display of the first vehicle.

2. The computer-implemented method of claim 1, further comprising:
   determining that the currently overlapping section between the first navigation route and the second navigation route ends and responsively no longer causing the guidance data depicting vehicular actions that the first vehicle takes to follow the second vehicle to be displayed on the display of the first vehicle.

3. The computer-implemented method of claim 1, wherein the display of the first vehicle is a heads-up display.

4. The computer-implemented method of claim 1, wherein the guidance data includes a bounding box encompassing the second vehicle displayed on the display.

5. The computer-implemented method of claim 1, wherein the second navigation route of the second vehicle is received in response to the first vehicle satisfying a proximity threshold with respect to the second vehicle.

6. A system comprising:
   one or more processors; and
   one or more computer-readable storage media collectively storing program instructions which, when executed by the one or more processors, are configured to cause the one or more processors to perform a method comprising:
   receiving a first navigation route of a first vehicle;
   receiving a second navigation route of a second vehicle;
   comparing the first navigation route to the second navigation route to determine a currently overlapping section between the first navigation route and the second navigation route;
   determining that the first vehicle should follow the second vehicle based on a reliability score of the second vehicle satisfying a reliability threshold, wherein the reliability score for the second vehicle is based on historical route data of the second vehicle;
   issuing a command to the first vehicle to automatically follow the second vehicle during the overlapping section between the first navigation route and the second navigation route, wherein the first vehicle utilizes real-time vehicular sensor data collected from one or more integrated vehicular sensors to automatically follow the second vehicle during the overlapping section.

7. The system of claim 6, wherein the method performed by the one or more processors further comprises:
   determining that the currently overlapping section between the first navigation route and the second navigation route ends and responsively providing instructions to the first vehicle to stop following the second vehicle and to resume following the first navigation route.

8. The system of claim 6, wherein the second navigation route of the second vehicle is received in response to the first vehicle satisfying a proximity threshold with respect to the second vehicle.

9. The system of claim 6, wherein the reliability score is calculated based on a frequency that the second vehicle changes routes during navigation as indicated within the historical route data of the second vehicle.

10. The system of claim 6, wherein the determination that the first vehicle should follow the second vehicle is further completed based on a comparison between a first driving tendency classification of the first vehicle and a second driving tendency classification of the second vehicle, wherein the first and second driving tendency classifications are determined based on historical driving data associated with the first and second vehicles, respectively.

11. A computer program product comprising one or more computer readable storage media, and program instructions collectively stored on the one or more computer readable storage media, the program instructions comprising instructions configured to cause one or more processors to perform a method comprising:

receiving a first navigation route of a first vehicle;
receiving a second navigation route of a second vehicle;
comparing the first navigation route to the second navigation route to determine a currently overlapping section between the first navigation route and the second navigation route;
determining that the first vehicle should follow the second vehicle based on a reliability score of the second vehicle satisfying a reliability threshold, wherein the reliability score for the second vehicle is based on historical route data of the second vehicle;
issuing a command to the first vehicle to automatically follow the second vehicle during the overlapping section between the first navigation route and the second navigation route, wherein the first vehicle utilizes real-time vehicular sensor data collected from one or more integrated vehicular sensors to automatically follow the second vehicle during the overlapping section; and
causing guidance data depicting vehicular actions that the first vehicle takes to follow the second vehicle to be displayed on a display of the first vehicle.

12. The computer program product of claim 11, wherein the method performed by the one or more processors further comprises:
determining that the currently overlapping section between the first navigation route and the second navigation route ends and responsively no longer causing the guidance data depicting vehicular actions that the first vehicle takes to follow the second vehicle to be displayed on the display of the first vehicle.

13. The computer program product of claim 11, wherein the display of the first vehicle is an extended reality (XR) device worn by a user of the first vehicle.

14. The computer program product of claim 13, wherein the guidance data includes a visual indicator indicating a position of the second vehicle on the XR device.

15. The computer program product of claim 11, wherein the second navigation route of the second vehicle is received in response to the first vehicle satisfying a proximity threshold with respect to the second vehicle.

* * * * *